United States Patent [19]
Grosch

[11] Patent Number: 4,578,630
[45] Date of Patent: Mar. 25, 1986

[54] BUCK BOOST SWITCHING REGULATOR WITH DUTY CYCLE LIMITING

[75] Inventor: James T. Grosch, Budd Lake, N.J.

[73] Assignee: AT&T Bell Laboratories, Murray Hill, N.J.

[21] Appl. No.: 674,162

[22] Filed: Nov. 23, 1984

[51] Int. Cl.<sup>4</sup> ............................................... G05F 1/46
[52] U.S. Cl. .................................... 323/271; 323/282; 323/284; 323/350; 323/351; 363/101
[58] Field of Search ............... 323/271, 280, 282, 284, 323/292, 350, 351; 363/101, 131, 132, 133

[56] References Cited
U.S. PATENT DOCUMENTS
4,245,286  1/1981  Paulkovich et al. ................... 363/21
4,395,675  7/1983  Toumani .............................. 323/271

*Primary Examiner*—Patrick R. Salce
*Assistant Examiner*—Anita M. Ault
*Attorney, Agent, or Firm*—Charles Scott Phelan

[57] ABSTRACT

In a buck-boost, switching regulator, separate signals are developed to control duty cycles of regulator switches. Control exercised by a pair of feedback-determined reference signal voltages through which a ramp signal is swept at inputs of separate comparators, comparator outputs control respective switches. A predetermined maximum voltage difference is permitted between the reference signal voltages. The reference used to control switching of one end of the regulator inductance is limited to a minimum voltage corresponding to a minimum duty cycle greater than 0% while the other reference is used to control the other end of that inductance and is limited to a maximum voltage corresponding to a minimum duty cycle less than 100%. A current limiting feedback from one of the switches is operated in response to current in excess of a predetermined level to force the ramp signal to a level corresponding to 0% duty cycle for both switches at the same time.

9 Claims, 2 Drawing Figures

BUCK BOOST SWITCHING REGULATOR WITH DUTY CYCLE LIMITING

FIELD OF THE INVENTION

This invention relates to buck boost switching regulators, and it relates more particularly to such regulators having separately controllable duty cycles for their switches.

BACKGROUND OF THE INVENTION

One useful type of buck boost switching regulator is shown in U.S. Pat. No. 4,395,675. Such a regulator utilizes two synchronized switches, often called a ground switch and a battery switch. Those switches operate at either the same or different duty cycles, in response to a freely variable, regulator, feedback signal, to control energy storage in a two terminal inductor element and energy delivery from that element to the regulator output. However, such regulators are difficult to control if operated so that the duty cycles for the ground switch and the battery switch approach too close to the 0% point and the 100% point, respectively. Illustrative difficulties may include, for example, discontinuities in the regulator output voltage.

Another buck boost regulator is shown in a U.S. Pat. No. 4,245,286 to J. Paulkovich et al., and employs current and temperature limiting functions to inhibit operation of a pulse width modulator and thus terminate switching transistor drives in the regulator.

SUMMARY OF THE INVENTION

In an improved regulator, separate control signals are derived from a regulator output feedback signal for use in individually, variably controlling the regulator battery switch and ground switch duty cycles so that one of the switches operates with a predetermined nonzero minimum duty cycle. In addition, circuits that produce the control signals are coupled by a slack link coupling so that a variable voltage difference between them cannot exceed a predetermined maximum value, but that difference is fixed at that value in a duty cycle range extending up to a predetermined maximum for the other of the switches.

BRIEF DESCRIPTION OF THE DRAWINGS

A more complete understanding of the invention and its various features, objects and advantages can be obtained from a consideration of the following detailed description in connection with the appended claims and the attached drawings in which:

DETAILED DESCRIPTION

Figure 1:
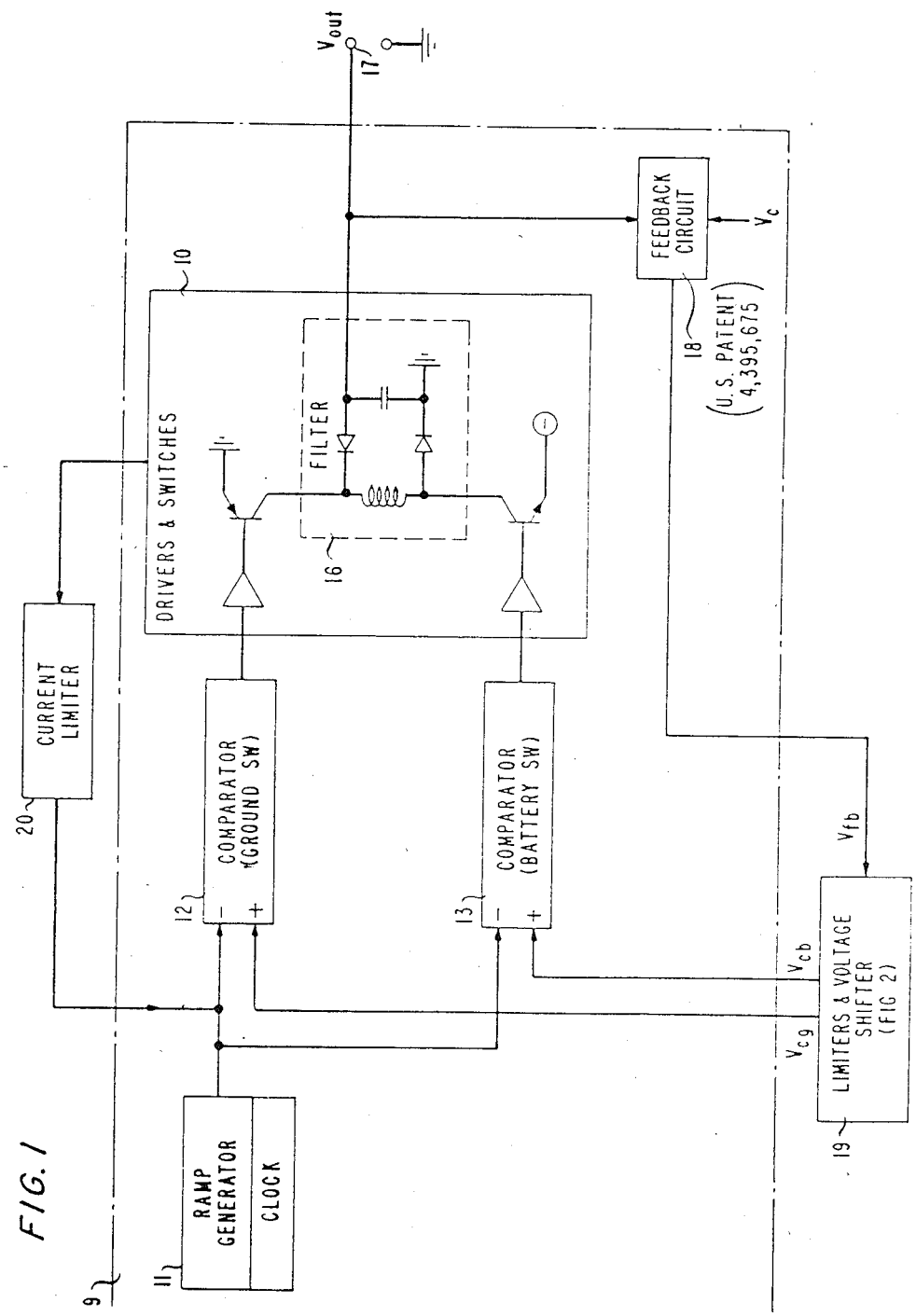
FIG. 1 is a simplified block and line diagram of a switching regulator in accordance with the present invention.

FIG. 1 depicts a transformerless, noninverting, buck boost, switching regulator 9 of the type in U.S. Pat. No. 4,395,675 to R. Toumani. The disclosure of that Toumani patent is hereby incorporated herein by reference. However, that disclosure also will be outlined herein, with certain changes, to facilitate understanding by a reader of the improvement of the present invention.

In the Toumani regulator, an inductor has its opposite ends switchably connected to opposite terminals, illustratively ground and negative, of a voltage supply. To that end, drivers and switches 10 therefore are driven in synchronism from an output of a clocked ramp generator 11 through voltage comparators 12 and 13 for the ground switch and the battery switch, respectively. The output of that ramp generator is compared to a pair of control, or reference, voltages Vcg and Vcb at inputs of the comparators 12 and 13, respectively, to fix the respective duty cycles of operation of the ground and battery switches in the regulator. Ramp generator 11 is preferably clock driven, illustratively at about 128 kilohertz in a voltage range of zero to plus two volts. Each ramp cycle starts its linear rise as soon as it retraces to zero at the end of the previous cycle.

In one embodiment (not shown), the ramp generator functions indicated in the Toumani circuit were implemented by a clock signal which operates a differential pair current switch to initiate input current to a current mirror amplifier when the clock goes high. Current mirror output begins at a level much higher than a current source charging current to a grounded ramp generator capacitor. That output is connected through another differential pair current switch to discharge that capacitor rapidly. The latter switch is so biased that as soon as the capacitor discharges to ground voltage, the switch operates to terminate discharge and thereby allow charging to resume. Bias on the latter switch is so arranged that it cannot switch back again until after the clock has terminated conduction in the current mirror amplifier. In this way, ramp signal peak output is fixed by cooperation of the clock signal and of the current source charging of the capacitor; and it is terminated when the capacitor discharges to ground. Precise control of the ramp signal facilitates duty cycle control in the manner to be described.

A low pass inductor-capacitor filter 16 includes the aforementioned inductor, and in part of each ramp cycle the switches are both closed at once to store energy in the inductor. Otherwise, at least one of the switches is open to allow release of stored energy to the filter capacitor and to a load (not shown) connected at the regulator output 17. The amount of energy so released depends, in large part, upon the duty cycles of the respective ground and battery switches. By filtering the regulator output as indicated, an essentially smooth average negative voltage output Vout is produced.

The smoothed negative output voltage is fed back through a feedback circuit 18 wherein it is compared to a control voltage Vc used to determine the voltage regulation of the output of regulator 9. Gain of circuit 18 is set to maintain regulator stability against oscillation while the driver and switches 10 are operating in a linear fashion. Output voltage Vfb from circuit 18 is positive with respect to ground and varies about a nominal value representing no error difference between the regulator output Vo and the regulating control voltage Vc. That feedback signal is applied to a limiters and voltage shift circuit 19, to be described in connection with FIG. 2, which produces Vcg and Vcb reference control voltages. More particularly, those control voltages are limited, either by operation of circuit 19 or by inherent restrictions in a system to which Vout is applied, to values that prevent either switch, once regulator operation has begun, from operating on a 0% (continuously open) or a 100% (continuously closed) duty cycle. Furthermore, the voltage difference between Vcg and Vcb is limited to a predetermined maximum value to achieve an advantageous compromise between efficiency of regulation and maximum attainable output voltage of the regulator.

A current limiter 20 is also provided to protect the regulator switches from excessive currents that may occur, e.g., during transitory functions such as powering up or down. The input to limiter 20 is coupled, e.g., by a current mirror type of circuit (not shown), to be responsive to battery switch current. If that current exceeds a predetermined level known to be useful without damaging circuit elements of drivers and switches circuit 19, a clamp is activated to clamp the output of the ramp generator to a voltage that is higher than either Vcg or Vcb can attain. (Note that, in the particular illustrative implementation considered herein, the comparators and coupling arrangements are advantageously implemented so that the switch-open part of a cycle is the time when the switch control voltage Vcg or Vcb is smaller than the ramp signal, rather than larger as in the Toumani patent.) Such clamping causes both switches of the regulator to be opened for the remainder of the cycle of the ramp generator before resuming normal operation. During the time of both switches being open, excessive load current discharges safely in filter 16.

Figure 2:
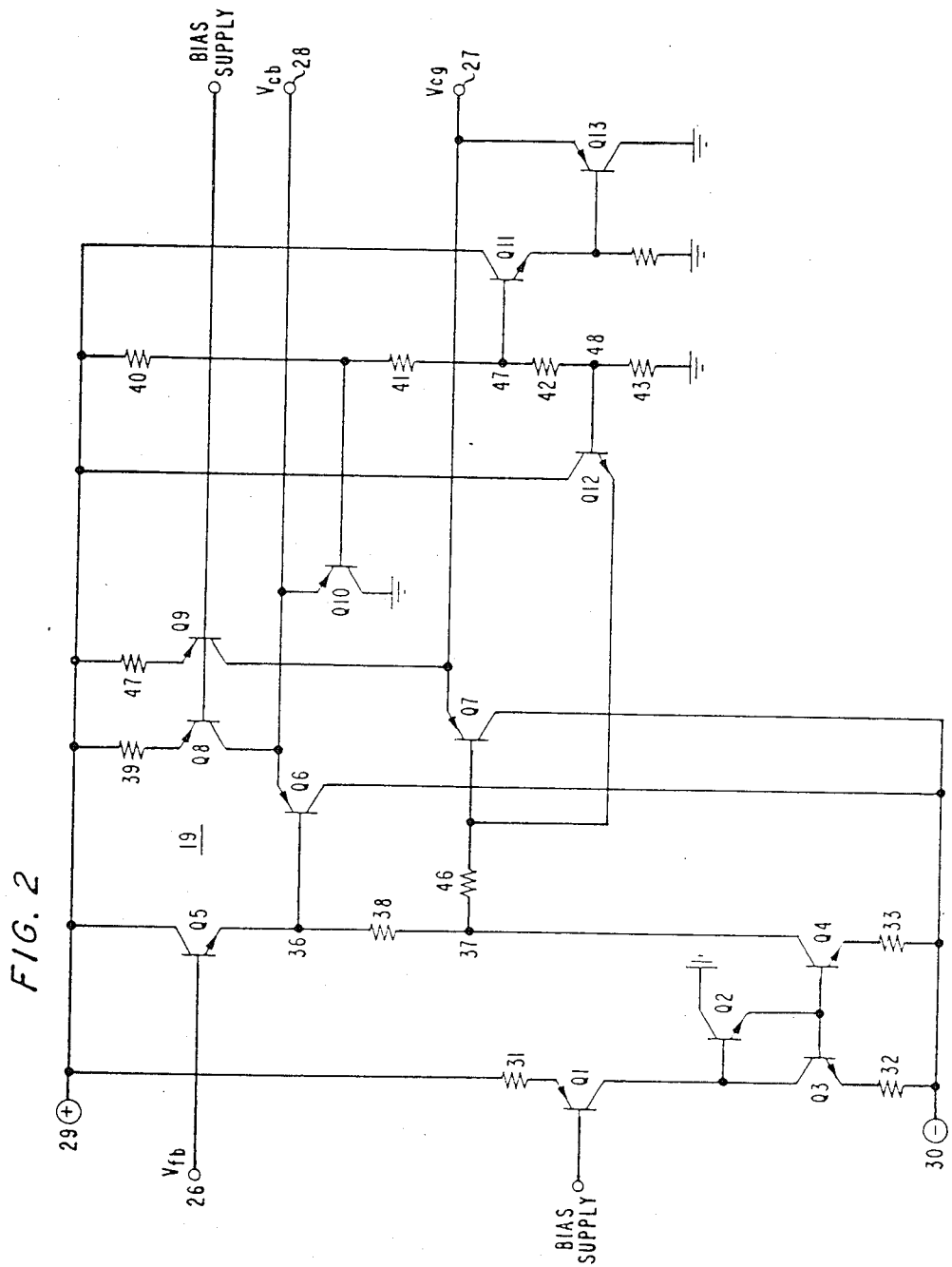
FIG. 2 is a schematic diagram of a duty cycle control signal limiting circuit that is useful in the regulator of FIG. 1.

FIG. 2 illustrates the limiters and voltage shifter circuit 19 detail for one embodiment in which some limits are imposed on Vcb and Vcg by operation of circuit 19 and some are a result of inherent operations of a system in which the circuit 19 is employed. This circuit responds to feedback Vfb from the regulator output, via circuit 18 and received at an input terminal 26, to produce the aforementioned limited control signals Vcg and Vcb at output terminals 27 and 28, respectively. Circuit 19 operates between positive and negative voltage supplies 29 and 30, respectively, which are schematically represented by circled polarity signs to represent a supply such as a battery having its terminal of the indicated polarity connected to the circuit point indicated and having a terminal of opposite polarity connected to ground.

A bias supply applied to a base terminal of a pnp transistor Q1 fixes the level of an input current, provided through a resistor 31 from supply 29, to a current mirror including npn transistors Q2, Q3, and Q4. Emitter terminals of transistors Q3 and Q4 are connected through resistors 32 and 33, respectively, to supply 30; and a collector terminal of helping transistor Q2 is directly connected to ground. Thus, transistor Q4 operates as a current source for a current of, illustratively, 100 microamperes.

The input signal Vfb is applied to a base terminal of an npn voltage follower transistor Q5 to vary its collector-emitter voltage drop and hence the voltage levels with respect to ground of opposite terminals 36 and 37 of a resistor 38. That resistor is connected in series with an internal collector-emitter path of transistor Q5 between supply 29 and a collector terminal of transistor Q4. Resistor 38 couples circuits that produce control voltages Vcb and Vcg; and when it conducts essentially the full current of current source transistor Q4, the drop across the resistor fixes the maximum difference between voltages Vcb and Vcg. When the resistor 38 conducts less than that full current, it becomes a slack coupling link; and the voltage difference Vcb-Vcg becomes smaller than the maximum difference. In the illustrative embodiment the full-current drop is advantageously about one volt.

Terminal 36 is connected to a base terminal of a pnp transistor Q6 which is connected in series with a resistor 39 and a current-source-connected pnp transistor Q8 between supplies 29 and 30. The emitter terminal of transistor Q6 is also connected to output terminal 28. Since the voltage drop across the base-emitter junction of transistor Q5 is offset by the voltage rise across the base-emitter junction of transistor Q6, output control voltage Vcb is essentially the same as input voltage Vfb. However, a pnp transistor Q10 is connected between the emitter of transistor Q6 and ground to limit positive-going excursions of Vcb to a voltage such as 2.7 volts. That voltage limit is set at the base terminal of transistor Q10 by connection to a potential divider including resistors 40, 41, 42, and 43 connected in series between supply 29 and ground. The 2.7-volt limit on Vcb is greater than the ramp output peak in normal operation but less than the level to which that output is pulled during limiting operation of current limiter 20.

Limiting action of transistor Q10 was set as described to prevent Vcb from transiently going high enough to saturate input transistors of comparator 13 to which it is applied. It is assumed that system considerations (e.g., the maximum output voltage required) inherently limit Vcb during normal operation to a level corresponding to no more than about a 95% duty cycle for the battery switch. If such an assumption were not possible, it is only necessary to reproportion resistors 40–43 so that transistor Q10 operates to achieve that duty cycle limit, i.e., hold Vcb illustratively to no more than plus 1.9 volts. No minimum limiter is required for Vcb because, for all loaded conditions of the regulator, the battery switch is normally closed more than 10% of the time, and it cannot approach closer to a 0% duty cycle. For nonloaded conditions, uncertainties in actual gain of the battery switch are offset sufficiently by the low gain of the filter 16 in nonloaded conditions to prevent the regulator loop from becoming unstable.

Terminal 37 of resistor 38 is connected via a resistor 46 to a base terminal of a pnp transistor Q7; and that transistor is connected in series with a resistor 47 and a current-source-connected pnp transistor Q9 between supplies 29 and 30. Transistors Q8 and Q9 have the same base bias supply; and each is arranged to supply a current, such as 50 microamperes, to its associated one of transistors Q6 and Q7 to maintain the latter transistors in conduction in all times of operation. The emitter terminal of transistor Q7 is connected to output terminal 27 so voltage Vcg is at a level equal to the voltage at terminal 37 plus any drop across resistor 46 and plus the base-emitter junction voltage of transistor Q7. Voltage Vcg can also be said to be a down shifted version of Vfb, hence the term "shifter" in the name of circuit 19.

Positive-going excursions of Vcg are limited to a voltage, at a terminal 47 between resistors 41 and 42, coupled through a voltage follower npn transistor Q11 and a pnp transistor Q13. That transistor Q13 is connected between terminal 27 and ground. The terminal 47 voltage is less than the limit for terminal 28 and is advantageously about midway in the sweep range of the ramp generator 11 output to fix a maximum duty cycle limit of about 50%. This duty cycle limit is established so that the regulator can still achieve maximum output voltage during normal operation; but, during transient conditions such as when reference voltage Vc in FIG. 1 suddenly becomes much more positive, the ground switch will not exceed 50% duty cycle. This is necessary because it has been found that if the ground switch is operated at greater than about 70% duty cycle, not enough time is allowed for the energy in the inductor in the filter 16 to be transferred to the load. This situation causes Vout to drop, which in turn makes Vc even more positive, making the problem even more pronounced. The regulator will eventually "latch-up" in an unrecoverable state if this continues. By limiting the ground switch to 50% duty cycle, there is always sufficient time for the inductor energy to be transferred.

An npn transistor Q12 has its internal collector-emitter path connected between supply 29 and the base of transistor Q7. The base terminal of transistor Q12 is connected to a terminal 48 between resistors 42 and 43 to provide a limiting function. When the maximum voltage difference appears across resistor 38, the voltage at terminal 37 is more positive than the sum of the base bias, e.g., illustratively about 0.2 volt, and the base-emitter junction drop of transistor Q12; and the latter transistor is nonconducting. However, if Vfb should swing so negative that the voltage at terminal 37 goes below that sum, transistor Q12 conducts to clamp the base of transistor Q7 to that level and thereby prevent further negative-going excursion of Vcg. This establishes the minimum duty cycle, illustratively 10%, of the ground switch. The Q12 conduction causes current to flow through resistor 46 to transistor Q4 thereby reducing the share of the current in that transistor from transistor Q5 and reducing current in, and drop across, resistor 38.

The maximum difference imposed by the drop across resistor 38 allows the regulator to achieve all desired output voltages with maximum efficiency. The regulator is more efficient for a given output voltage if that voltage can be produced by operating the battery switch only. However, due to the duty cycle related problem of controlling the regulator as mentioned earlier, the ground switch must operate at least 10% of the time. Additionally, it is desirable to be able to produce the regulator's maximum boosted output without letting either switch get above the 95% duty cycle point. The 1-volt difference imposed by the limiters/shifter circuit 19 maximizes the battery switch duty cycle for a given output voltage subject to the two duty cycle constraints mentioned above.

Although the present invention has been described in connection with a particular embodiment thereof, it is to be understood that additional embodiments, applications, and modifications which will be apparent to those skilled in the art are included within the spirit and scope of the invention.

What is claimed is:

1. A duty-cycle limited, buck-boost, switching regulator including first and second switches for connecting, with adjustable duty cycle, opposite terminals of an inductance to different ones of terminals for receiving operating voltage and said regulator comprising
first and second means, responsive to a regulator output signal, for developing first and second duty cycle control signals for adjusting duty cycles of said first and second switches, and
means for limiting a voltage difference between said control signals to a maximum value substantially less than a value corresponding to a maximum range of duty cycle adjustment of one of said switches.

2. The regulator in accordance with claim 1 in which said limiting means comprises
a slack link coupling means connected between said first and second developing means and comprising
means in said first developing means for operating such developing means to control said first switch as a lead switch with duty cycle adjusted in response to all regulator output signal changes within a predetermined range, and
means in said second developing means for cooperating with said coupling means to operate such developing means to control said second switch as a lag switch with its duty cycle adjusted in response to only those regulator output signal changes which, on increasing control signal, would otherwise require said voltage difference to be greater than said maximum value and, on decreasing control signal, to maintain said maximum value of voltage difference to the extent possible within a predetermined voltage adjustment range for said second switch.

3. The regulator in accordance with claim 2 in which said second developing means includes means for limiting said second control signal to a voltage range having a minimum value less than said voltage difference and corresponding to a second switch duty cycle substantially greater than 0%.

4. The regulator in accordance with claim 1 in which said voltage difference limiting means comprises
a resistor and a current source connected in series,
means, responsive to a regulator output signal, for shifting a fixed voltage drop across said resistor to different voltage levels without substantially changing the magnitude of said drop, and
means for deriving said duty cycle control signals from opposite ends of said resistor.

5. The regulator in accordance with claim 4 in which said deriving means comprises
means for limiting an excursion magnitude of at least one of said duty cycle control signals.

6. The regulator in accordance with claim 5 in which said excursion limiting means comprises
means, responsive to a duty cycle control signal derived at a lower voltage end of said resistance, both for limiting the last-mentioned control signal maximum excursion at a level corresponding to a duty cycle of less than 100% and for limiting the same control signal minimum excursion at a level corresponding to a duty cycle of more than 0%.

7. The regulator in accordance with claim 6 in which said excursion limiting means further comprises
a resistance voltage divider having a plurality of taps at different voltage points,
means for coupling a higher voltage one of said taps to set a threshold for said maximum excursion limiting means, and
means for coupling a lower voltage one of said taps to set a threshold for said minimum excursion limiting means.

8. The regulator in accordance with claim 7 in which said excursion limiting means further comprises
means for comparing voltages at said lower voltage one of said taps and at said lower voltage end of said resistor and when the latter is at a lower voltage directing current into said current source and thereby clamping said second deriving means at a voltage approximately equal to the voltage at said lower voltage one of said taps.

9. The regulator in accordance with claim 1 which further comprises
means for generating a recurrent ramp signal, first and second comparators each having an output connected for opening and closing a different one of said first and second switches and having inputs connected to receive said ramp signal and a different one of said reference signals, and means, responsive to current of at least a predetermined level in one of said switches for clamping an output of said generating means to a value corresponding to 0% duty cycle for both of said switches.

* * * * *